United States Patent
Gao

(10) Patent No.: US 11,562,074 B2
(45) Date of Patent: Jan. 24, 2023

(54) FIRMWARE UPGRADE METHOD AND DEVICE, AND STORAGE MEDIUM

(71) Applicant: BEIJING XIAOMI MOBILE SOFTWARE CO., LTD., Beijing (CN)

(72) Inventor: Shan Gao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 273 days.

(21) Appl. No.: 16/919,304

(22) Filed: Jul. 2, 2020

(65) Prior Publication Data
US 2021/0216637 A1    Jul. 15, 2021

(30) Foreign Application Priority Data
Jan. 10, 2020    (CN) .......................... 202010027136.7

(51) Int. Cl.
*G06F 9/44*      (2018.01)
*G06F 21/57*     (2013.01)
*G06F 8/654*     (2018.01)
*G06F 8/71*      (2018.01)
*H04L 9/40*      (2022.01)

(52) U.S. Cl.
CPC ............ *G06F 21/572* (2013.01); *G06F 8/654* (2018.02); *G06F 8/71* (2013.01); *H04L 63/0876* (2013.01); *H04L 63/123* (2013.01)

(58) Field of Classification Search
None
See application file for complete search history.

(56) References Cited

U.S. PATENT DOCUMENTS

| 10,684,842 | B2 * | 6/2020 | Lin ........................... G06F 8/65 |
| 10,684,845 | B2 * | 6/2020 | Vangeel .................... G06F 8/65 |
| 2009/0300136 | A1 * | 12/2009 | Loo ........................ H04L 67/025 709/217 |
| 2011/0302574 | A1 * | 12/2011 | Yoshikawa ............... G06F 8/65 717/173 |
| 2018/0365423 | A1 * | 12/2018 | Poppe ....................... G06F 8/65 |
| 2021/0279051 | A1 * | 9/2021 | Wu ......................... G06F 8/654 |

FOREIGN PATENT DOCUMENTS

CN       110445660 A      11/2019

OTHER PUBLICATIONS

Extended European Search Report in Application No. 20185843.8, dated Dec. 10, 2020.

* cited by examiner

*Primary Examiner* — Qamrun Nahar
(74) *Attorney, Agent, or Firm* — Syncoda LLC; Feng Ma

(57) ABSTRACT

A firmware upgrade method can be applied to a terminal, and include: receiving a broadcast message for broadcasting an updated firmware type sent by a cloud server; sending firmware information matching the firmware type to the cloud server; and receiving a firmware upgrade package corresponding to the firmware information pushed by the cloud server. As a result, the space of the storage medium of the terminal is effectively saved, and the efficiency of firmware upgrade is improved.

17 Claims, 10 Drawing Sheets

FIRMWARE UPGRADE METHOD AND DEVICE, AND STORAGE MEDIUM

CROSS-REFERENCE TO RELATED APPLICATION

This application claims priority to Chinese Patent Application 202010027136.7 filed on Jan. 10, 2020, the disclosure of which is hereby incorporated by reference in its entirety.

BACKGROUND

The Over The Air (OTA) technology is a common firmware upgrade method. In the application process, it may first be necessary to package all the firmware upgrade packages into the storage medium of the terminal, and then make a selection and judgment for the firmware upgrade packages packaged into the storage medium of the terminal to determine which firmware upgrade packages are upgrade packages of the firmware that needs to be upgraded by the terminal.

SUMMARY

The present disclosure generally relates to the technical field of firmware upgrade, and more specifically, to a firmware upgrade method, a firmware upgrade device, and a storage medium.

According to a first aspect of the present disclosure, there is provided a firmware upgrade method applied to a terminal, and the firmware upgrade method includes: receiving a broadcast message for broadcasting an updated firmware type sent by a cloud server; sending firmware information matching the firmware type to the cloud server; and receiving a firmware upgrade package corresponding to the firmware information pushed by the cloud server.

In some implementations, the firmware upgrade method further includes: downloading the firmware upgrade package based on a download address of the firmware upgrade package, and performing firmware upgrade based on the firmware upgrade package.

In some implementations, the firmware upgrade method further includes: writing data contained in the firmware upgrade package into a storage medium partition in a specified data format; and reading data in the storage medium partition to perform firmware upgrade after detecting that the terminal is powered on.

In some implementations, the sending firmware information matching the firmware type to the cloud server includes: invoking a firmware upgrade tool to view a product serial number and a firmware version number of a firmware stored locally in a terminal after the broadcast message is received by the terminal, and sending the product serial number and the firmware version number of the firmware to the cloud server.

In some implementations, the sending firmware information matching the firmware type to the cloud server includes: sending the firmware information matching the firmware type to the cloud server in JSON format.

In some implementations, the firmware upgrade method further includes: receiving a verification code for verifying integrity of the firmware upgrade package sent by the cloud server; and verifying integrity of the downloaded firmware upgrade package based on the verification code, and performing firmware upgrade based on the firmware upgrade package when the verification is passed.

In some implementations, the firmware upgrade method further includes: downloading the firmware upgrade package again based on the download address when the verification of the integrity of the downloaded firmware upgrade package fails.

In some implementations, the specified data format includes: a flag bit of a firmware upgrade area in a storage medium partition, a product serial number of a firmware, a version number of a local firmware found in a terminal, a version number of a firmware written into a firmware upgrade area in a storage medium partition, a starting address of a firmware written into a firmware upgrade area in a storage medium partition, and a size of a firmware written into a firmware upgrade area in a storage medium partition.

In some implementations, the reading data in the storage medium partition and performing firmware upgrade includes: reading the data in the storage medium partition in accordance with the specified data format, and reading a product serial number of a firmware found locally; writing the data in the storage medium partition into a firmware storage area when information of a product serial number of a firmware contained in data in the storage medium partition is consistent with information of a product serial number of the firmware found locally; and invoking a machine restart instruction to restart a terminal to complete firmware upgrade when the data in the storage medium partition is successfully written into the firmware storage area.

In some implementations, the firmware upgrade method further includes: setting, in a register of a power management integrated circuit, a flag bit indicating that the upgrade fails when writing the data in the storage medium partition into a firmware storage area fails.

According to a second aspect of the present disclosure, there is provided a firmware upgrade method applied to a cloud server, and the firmware upgrade method includes: sending a broadcast message for broadcasting an updated firmware type when there is an updated firmware; receiving firmware information matching a firmware type sent by a terminal; and sending a firmware upgrade package corresponding to the firmware information to the terminal.

In some implementations, the firmware upgrade method further includes: sending a download address of the firmware upgrade package corresponding to the firmware information to the terminal.

In another implementation, the receiving firmware information matching a firmware type sent by a terminal includes: receiving firmware information matching a firmware type sent by the terminal in JSON format.

In some implementations, the firmware upgrade method further includes: sending a verification code for verifying integrity of the firmware upgrade package to the terminal.

According to a third aspect of the present disclosure, there is provided a firmware upgrade device applied to a terminal, the firmware upgrade device includes: a broadcast receiving module configured to receive a broadcast message for broadcasting an updated firmware type sent by a cloud server; a firmware information sending module configured to send firmware information matching the firmware type to the cloud server; and a firmware upgrade package receiving module configured to receive a firmware upgrade package corresponding to the firmware information pushed by the cloud server.

In some implementations, the firmware upgrade device further includes: an upgrade module configured to download the firmware upgrade package based on a download address of the firmware upgrade package, and perform firmware upgrade based on the firmware upgrade package.

In some implementations, the upgrade module is further configured to: write data contained in the firmware upgrade package into a storage medium partition in a specified data format; and read the data in the storage medium partition and perform firmware upgrade after detecting that the terminal is powered on.

In some implementations, the firmware information sending module is configured to: invoke a firmware upgrade tool to view a product serial number and a firmware version number of a firmware stored locally in a terminal after the broadcast message is received by the terminal, and send the product serial number and a firmware version number of the firmware to the cloud server.

In some implementations, the firmware information sending module is configured to: send firmware information matching the firmware type to the cloud server in JSON format.

In some implementations, the firmware upgrade package receiving module is further configured to: receive a verification code for verifying integrity of the firmware upgrade package sent by the cloud server; and the upgrade module is further configured to: verify integrity of the downloaded firmware upgrade package based on the verification code, and perform firmware upgrade based on the firmware upgrade package when the verification is passed.

In some implementations, the firmware upgrade device further includes: a download module configured to download the firmware upgrade package again based on the download address when the verification of the integrity of the downloaded firmware upgrade package fails.

In some implementations, the specified data format includes: a flag bit of a firmware upgrade area in a storage medium partition, a product serial number of a firmware, a version number of a local firmware found in a terminal, a version number of a firmware written into a firmware upgrade area in a storage medium partition, a starting address of a firmware written into a firmware upgrade area in a storage medium partition, and a size of a firmware written into a firmware upgrade area in a storage medium partition.

In some implementations, the upgrade module is further configured to: read the data in the storage medium partition in accordance with the specified data format, and read a product serial number of a firmware found locally; write the data in the storage medium partition into a firmware storage area when information of a product serial number of a firmware contained in the data in the storage medium partition is consistent with information of a product serial number of the firmware found locally; and invoke a machine restart instruction to restart a terminal to complete firmware upgrade when the data in the storage medium partition is successfully written into the firmware storage area.

In some implementations, the upgrade module is further configured to: set, in a register of a power management integrated circuit, a flag bit indicating that upgrade fails when data in the storage medium partition fails to be written into the firmware storage area.

According to a forth aspect of the present disclosure, there is provided a firmware upgrade device applied to a cloud server, and the firmware upgrade device includes: a broadcast sending module configured to send a broadcast message for broadcasting an updated firmware type when there is an updated firmware; a firmware information receiving module configured to receive firmware information matching a firmware type sent by a terminal; and a firmware upgrade package sending module configured to send a firmware upgrade package corresponding to the firmware information to the terminal.

In some implementations, the firmware upgrade package sending module is further configured to: send a download address of the firmware upgrade package corresponding to the firmware information to the terminal.

In some implementations, the firmware information receiving module is configured to: receive firmware information matching a firmware type sent by a terminal in JSON format.

In some implementations, the firmware upgrade package sending module is further configured to: send a verification code for verifying integrity of the firmware upgrade package to the terminal.

According to a fifth aspect of the present disclosure, there is provided a firmware upgrade device including memory configured to store instructions; and a processor configured to invoke the instruction to execute the firmware upgrade method according to the first aspect or any one of the implementations in the first aspect.

According to a sixth aspect of embodiments of the present disclosure, there is provided a non-transitory computer-readable storage medium in which computer-executable instructions are stored, and when the computer-executable instructions are executed by a processor, the firmware upgrade method according to the first aspect or any one of the implementations in the first aspect is executed.

According to a seventh aspect of the present disclosure, there is provided a firmware upgrade device including memory configured to store instructions; and a processor configured to invoke the instruction to execute the firmware upgrade method according to the second aspect or any one of the implementations in the second aspect.

According to an eighth aspect of the present disclosure, there is provided a non-transitory computer-readable storage medium in which computer-executable instructions are stored, and when the computer-executable instructions are executed by a processor, the firmware upgrade method according to the second aspect or any one of the implementations in the second aspect is executed.

It is to be understood that both the foregoing general description and the following detailed description are exemplary and explanatory only and are not restrictive of the disclosure.

BRIEF DESCRIPTION OF THE DRAWINGS

The accompanying drawings, which are incorporated in and constitute a part of this disclosure, illustrate embodiments consistent with the present disclosure and, together with the description, serve to explain the principles of the present disclosure.

DETAILED DESCRIPTION

Description will now be made in detail to some embodiments, examples of which are illustrated in the accompanying drawings. The following description refers to the accompanying drawings in which the same numbers in different drawings represent the same or similar elements unless otherwise indicated. The implementations set forth in the following description of some embodiments do not represent all implementations consistent with the present disclosure. Instead, they are merely examples of apparatuses and methods consistent with aspects related to the present disclosure as recited in the appended claims.

In a typical firm upgrade, because a large number of upgrade packages of the firmware that may not need to be upgraded are stored in the storage medium, which occupies the space of the storage medium, the efficiency of the firmware upgrade is low.

Figure 1:
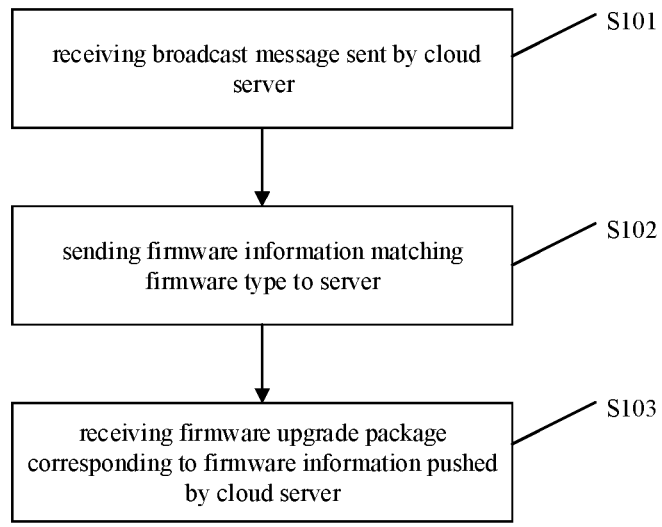
FIG. 1 is a flowchart illustrating a firmware upgrade method according to some embodiments of the present disclosure.

FIG. 1 is a flowchart illustrating a firmware upgrade method according to some embodiments of the present disclosure.

As shown in FIG. 1, the firmware upgrade method provided in the present disclosure is applied to a terminal, and the firmware upgrade method includes step S101, step S102 and step S103. Below, respective steps will be described, respectively.

In step S101, a broadcast message sent by a cloud server is received.

Herein, the broadcast message is used to broadcast an updated firmware type.

The cloud server can be understood as a one-stop cloud service software that can provide services such as data synchronization, backup, device search, space expansion, account management, firmware update, etc. for the terminal. Herein, the cloud server and the terminal are connected via communication.

The broadcast message can be to broadcast an updated firmware type to respective terminals communicatively connected with the cloud server, such as a camera module, a display module, a touch module, a fingerprint unlocking module, or the like.

In step S102, firmware information matching the firmware type is sent to the server.

The terminal looks up whether the firmware of the terminal matches the updated firmware type in the broadcast message. For example, if the updated firmware type in the broadcast message is a camera module, the camera module of the terminal found by the terminal matches the broadcast message.

When the firmware matching the updated firmware type which is broadcasted is found by the terminal, the firmware information of the found firmware is sent to the cloud server.

The terminal can invoke a local FFU_Tool (FFU, field firmware update) in the terminal to look up the product serial number of the firmware and the firmware version number of the local firmware in the terminal. The terminal sends the found firmware information of the firmware to the cloud server through the node at the bottom the CAT, such as PROC/MV.

In step S103, a firmware upgrade package corresponding to the firmware information pushed by the cloud server is received.

After the cloud server has received the firmware information sent by the terminal, it is looked up, in the cloud server, the firmware upgrade package corresponding to the firmware information, such as an upgrade package of the camera module, and the firmware upgrade package is pushed to the terminal.

In the firmware upgrade method provided by the present disclosure, by receiving the firmware upgrade package of the firmware that needs to be upgraded in the terminal, without receiving the firmware upgrade package of the firmware that does not need to be upgraded in the terminal, the space of the storage medium of the terminal is effectively saved, and the efficiency of firmware upgrade is improved.

Figure 2:
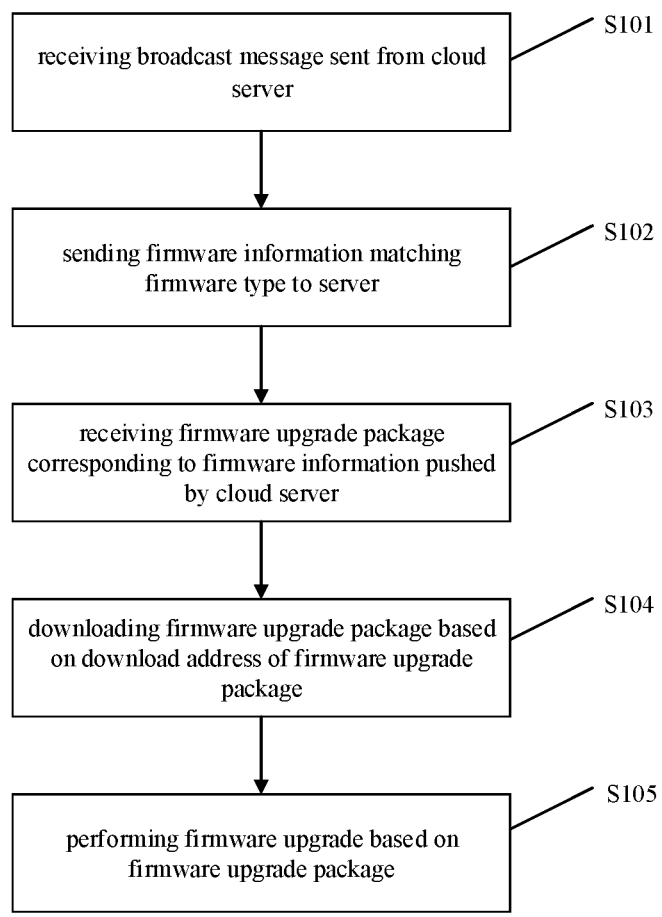
FIG. 2 is a flowchart illustrating another firmware upgrade method according to some embodiments of the present disclosure.

FIG. 2 is a flowchart illustrating another firmware upgrade method according to some embodiments of the present disclosure.

In some embodiments of the present disclosure, as shown in FIG. 2, the firmware upgrade method includes step S104 and step S105 in addition to step S101, step S102, and step S103. Below, step S104 and step S105 will be described, respectively.

In step S104, the firmware upgrade package is downloaded based on a download address of the firmware upgrade package.

After the cloud server has received the firmware information sent by the terminal, it is looked up, in the cloud server, the firmware upgrade package corresponding to the firmware information, such as the upgrade package of the camera module, and the download address of the upgrade package is sent to the terminal, and then the firmware upgrade package is downloaded by the terminal based on the download address of the upgrade package.

In step S105, firmware upgrade is performed based on the firmware upgrade package.

The corresponding firmware is upgraded by the terminal based on the downloaded firmware upgrade package.

By receiving the download address of the firmware upgrade package matching the firmware of the terminal, sent by the cloud server, the firmware upgrade package is downloaded to the terminal, and the firmware of the terminal is upgraded based on the firmware upgrade package.

The firmware upgrade package of the firmware that needs to be upgraded in the terminal is downloaded, and the upgrade process is performed on the firmware without downloading the firmware upgrade package of the firmware that does not need to be upgraded, such that the space of the storage medium of the terminal is saved effectively and the efficiency of firmware upgrade is improved.

Figure 3:
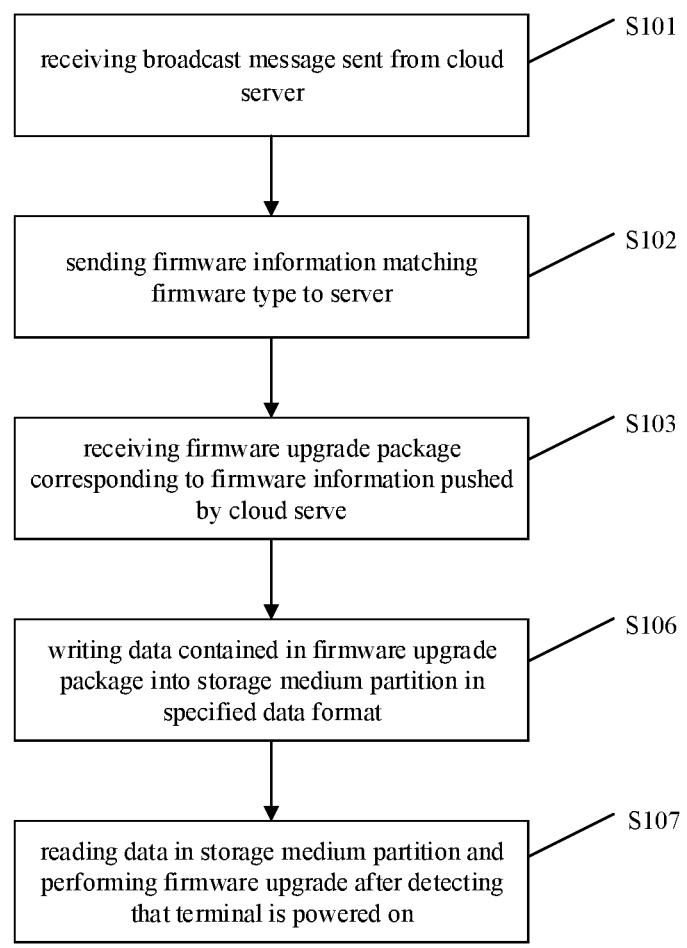
FIG. 3 is a flowchart illustrating yet another firmware upgrade method according to some embodiments of the present disclosure.

FIG. 3 is a flowchart illustrating yet another firmware upgrade method according to some embodiments of the present disclosure.

In some embodiments of the present disclosure, as shown in FIG. 3, the firmware upgrade method includes step S106 and step S107 in addition to step S101, step S102, and step S103. Below, the step S106 and step S107 will be described respectively.

In step S106, data contained in the firmware upgrade package is written into a storage medium partition in a specified data format.

In step S107, the data in the storage medium partition is read and firmware upgrade is performed after detecting that the terminal is powered on.

Herein, the storage medium partition can be understood as a storage area for storing firmware upgrade packages. When the firmware upgrade package is downloaded locally to the terminal, the FFU_Tool can be invoked to write the information of the firmware upgrade package to the corresponding storage area, which provides a basis for clearly reading and obtaining the relevant information of the firmware upgrade package during the subsequent firmware upgrade process.

When it is detected that the terminal is powered on, the firmware upgrade process is completed. And the firmware upgrade process is implemented by writing the read relevant information of the upgrade firmware package stored in the storage medium partition into a specified firmware storage area.

In this way, the firmware upgrade process is completed, and the upgrade process can be performed without requiring the user to manually click to update and upgrade.

Since the terminal only stores the firmware upgrade package of the firmware that needs to be upgraded, it can be ensured that in the case of occupying less memory of the terminal, the firmware upgrade can be completed after detecting that the terminal is powered on, and thus the firmware can be quickly upgraded.

In some embodiments of the present disclosure, the sending firmware information matching the firmware type to the cloud server includes: invoking a firmware upgrade tool to view a product serial number and a firmware version number of a firmware stored in a local terminal after the broadcast message is received by the terminal, and sending the product serial number and the firmware version number of the firmware to the cloud server.

The firmware upgrade tool can be an FFU_Tool. The product serial number of the firmware and the firmware version number of the firmware in the local terminal are looked up by invoking the local FFU_Tool in the terminal. The terminal sends the found product serial number and the firmware version number of the firmware to the cloud server through the node at the bottom of the CAT, such as PROC/MV.

In some embodiments of the present disclosure, the firmware information matching the firmware type is sent to the cloud server in JSON format.

After looking up and obtaining the product serial number and the firmware version number of the firmware in the local terminal, the firmware information in JSON format can be generated and then the firmware information in JSON format is sent to the cloud server, to facilitate the cloud server to read the firmware information.

Correspondingly, after receiving the firmware information in JSON format, the cloud server analyzes the firmware information in JSON format to obtain the corresponding firmware information.

After the cloud server has acquired the firmware information, the firmware upgrade package corresponding to the firmware information is looked up, and the download address of the upgrade package is sent to the terminal, and then the terminal downloads the firmware upgrade package based on the download address of the upgrade package, and performs firmware upgrade based on the firmware upgrade package.

Figure 4:
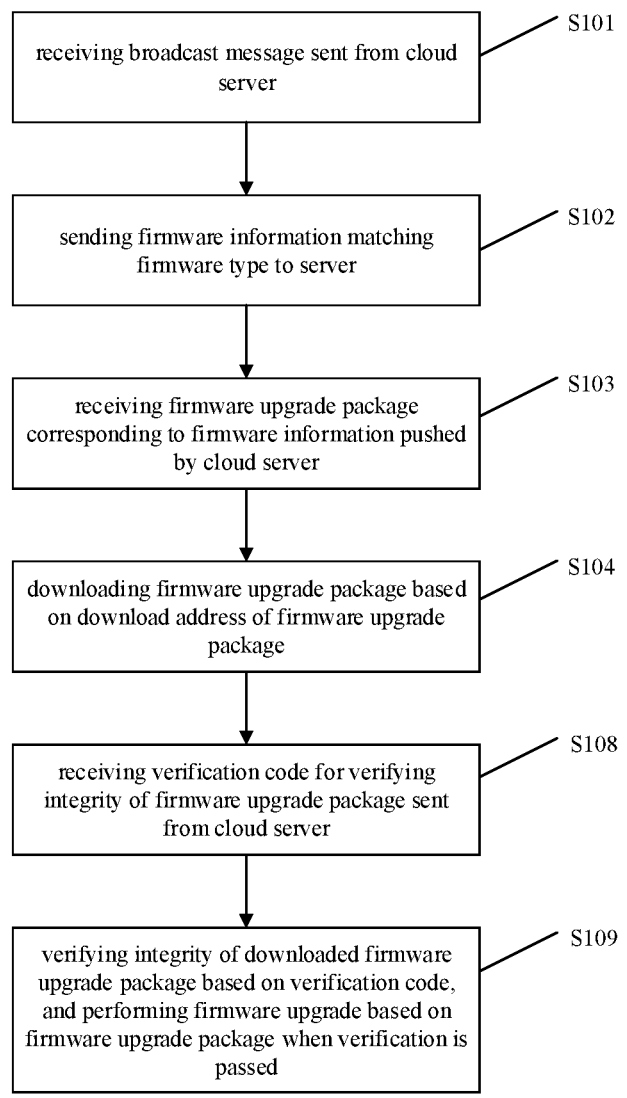
FIG. 4 is a flowchart illustrating another firmware upgrade method according to some embodiments of the present disclosure.

FIG. 4 is a flowchart illustrating another firmware upgrade method according to some embodiments of the present disclosure.

In some embodiments of the present disclosure, as shown in FIG. 4, the firmware upgrade method includes step S108 and step S109 in addition to step S101, step S102, step S103, and step S104. Below, the step S108 and step S109 will be described, respectively.

In step S108, a verification code for verifying the integrity of the firmware upgrade package, sent by the cloud server is received.

When the cloud server sends the download address of the firmware upgrade package to the terminal, it also sends the verification code for verifying the integrity of the firmware upgrade package to the terminal. Herein, the verification code corresponds to the firmware upgrade package.

In step S109, the integrity of the downloaded firmware upgrade package is verified based on the verification code, and the firmware upgrade is performed based on the firmware upgrade package when the verification is passed.

The verification code can be an MD5 verification code, and the verification code is used to verify the integrity of the firmware upgrade package transmitted and downloaded to the terminal. If the verification is passed, it means that the transmitted and downloaded firmware upgrade package is complete, and at this time, the terminal can perform firmware upgrade on the corresponding firmware based on the downloaded firmware upgrade package.

Figure 5:
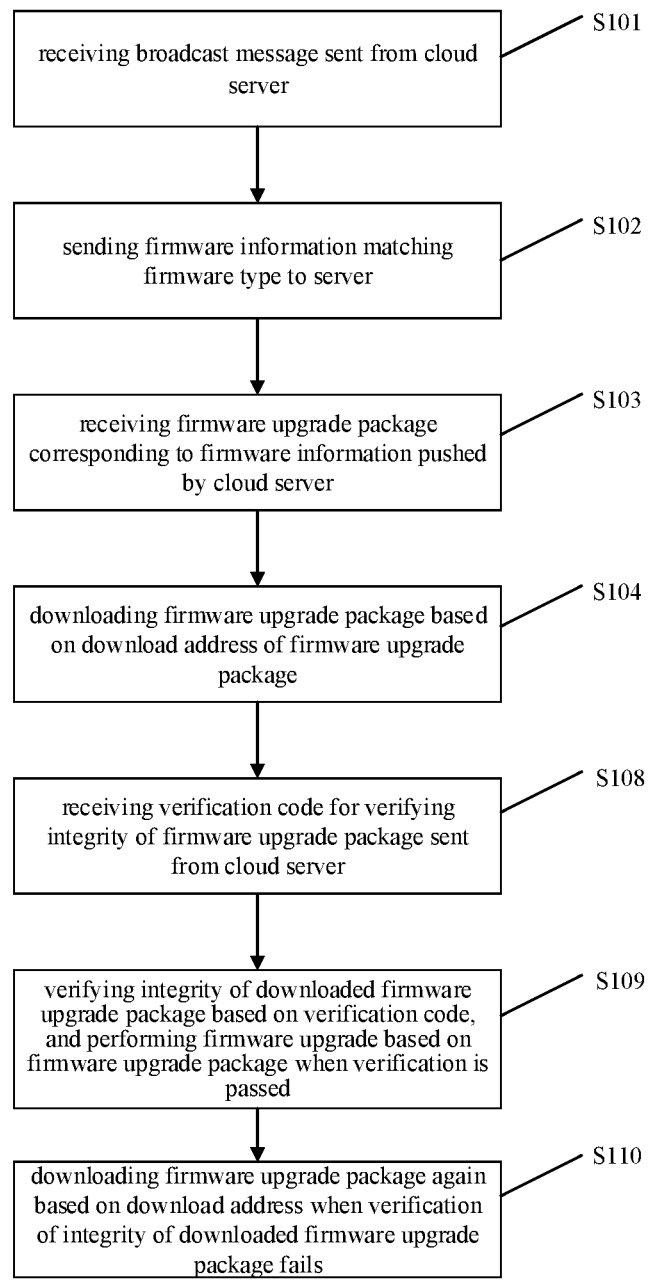
FIG. 5 is a flowchart illustrating yet another firmware upgrade method according to some embodiments of the present disclosure.

FIG. 5 is a flowchart illustrating yet another firmware upgrade method according to some embodiments of the present disclosure.

In some embodiments of the present disclosure, as shown in FIG. 5, the firmware upgrade method further includes step S110 in addition to step S101, step S102, step S103, step S104, step S108, and step S109. The step S110 will be described below.

In step S110, the firmware upgrade package is downloaded again based on the download address when the verification of integrity of the downloaded firmware upgrade package fails.

If the verification fails, it means that the transmitted and downloaded firmware upgrade package is incomplete, and at this time, the terminal cannot perform firmware upgrade on the corresponding firmware based on the downloaded firmware upgrade package, but needs to download the firmware upgrade package again based on the download address.

In some embodiments of the present disclosure, the specified data format includes: a flag bit of a firmware upgrade area in a storage medium partition, a product serial number of a firmware, a version number of a local firmware found in a terminal, a version number of a firmware written into a firmware upgrade area in a storage medium partition, a starting address of a firmware written into a firmware upgrade area in a storage medium partition, and a size of a firmware written into a firmware upgrade area in a storage medium partition.

Herein, the flag bit of the firmware upgrade area in the storage medium partition indicates that the storage medium partition is a partition about firmware upgrade starting from this bit. By means of the flag bit, it can be effectively distinguished that starting from which bit in the storage medium partition is the partition about firmware upgrade, which provides a basis for subsequent reading of the relevant information about the firmware upgrade package.

The data in the specified data format described above can be written into the first 128 bytes of the storage medium partition in sequence, and the upgrade firmware corresponding to the firmware upgrade package can be written starting from the 256 byte of the storage medium partition until all the upgrade firmware is written.

Figure 6:
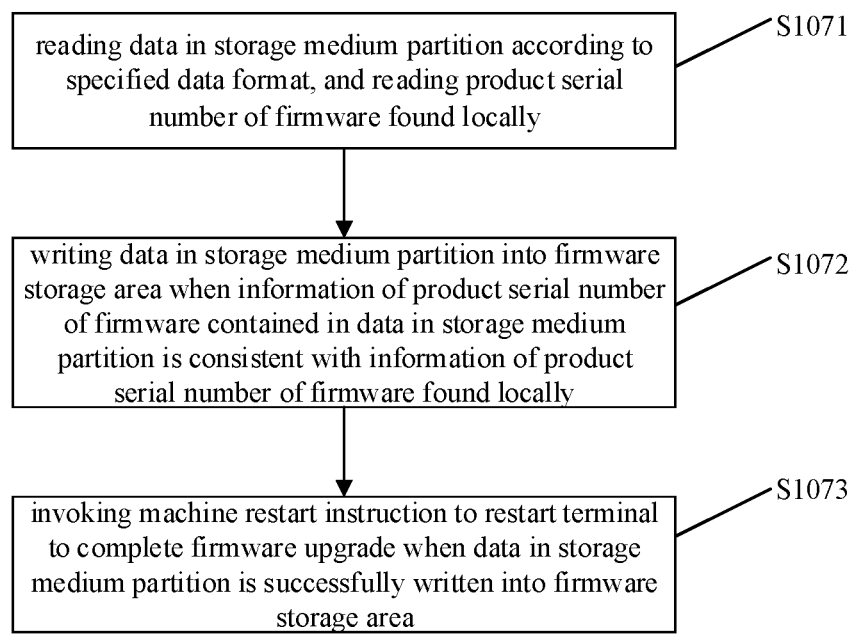
FIG. 6 is a flowchart illustrating yet another firmware upgrade method according to some embodiments of the present disclosure.

FIG. 6 is a flowchart illustrating yet another firmware upgrade method according to some embodiments of the present disclosure.

In some embodiments of the present disclosure, as shown in FIG. 6, the step S107 in the firmware upgrade method of the present disclosure can include step S1071, step S1072, and step S1073. Below, the step S1071, step S1072, and step S1073 will be described, respectively.

In step S1071, data in the storage medium partition is read in accordance with the specified data format, and a product serial number of a firmware found locally is read.

In step S1072, the data in the storage medium partition is written into a firmware storage area when information of a product serial number of a firmware contained in the data in the storage medium partition is consistent with information of a product serial number of the firmware found locally.

In step S1073, a machine restart instruction is invoked to restart a terminal to complete firmware upgrade, when the data in the storage medium partition is successfully written into the firmware storage area.

In the process of firmware upgrade, in order to further ensure the compatibility of the firmware to be upgraded by the terminal and the downloaded firmware, that is, to prevent the cloud server from sending a wrong upgrade firmware package to the terminal, for example, the firmware to be upgraded by the terminal is a camera module produced by company A, but the cloud server sends the firmware upgrade package of a camera module produced by company B. The firmware upgrade method can further determine whether the product serial number in the data information of the upgrade firmware package stored in the storage medium partition is consistent with the product serial number of the firmware to be upgraded by the terminal, i.e., the read product serial number of the firmware found locally.

If they are consistent, it means that the cloud server does not send the wrong upgrade firmware package to the terminal, and at this time, the terminal can write the data into the firmware storage area based on the data of the upgrade firmware package stored in the storage medium partition, and invoke the machine restart instruction to restart the terminal, for example, invoke machine restart to complete the firmware upgrade after the data is written successfully.

In the process of writing the data into the firmware storage area, the scsi_execute function can be used to write the data of the upgrade firmware package into the firmware storage area.

If they are inconsistent, it means that the cloud server sends the wrong upgrade firmware package to the terminal, and at this time, the found firmware information of the firmware matching the broadcast message can be sent to the cloud server again, the firmware upgrade package can be downloaded based on the download address of the firmware upgrade package corresponding to the firmware information sent by the cloud server, and the firmware upgrade can be performed based on the firmware upgrade package.

Figure 7:
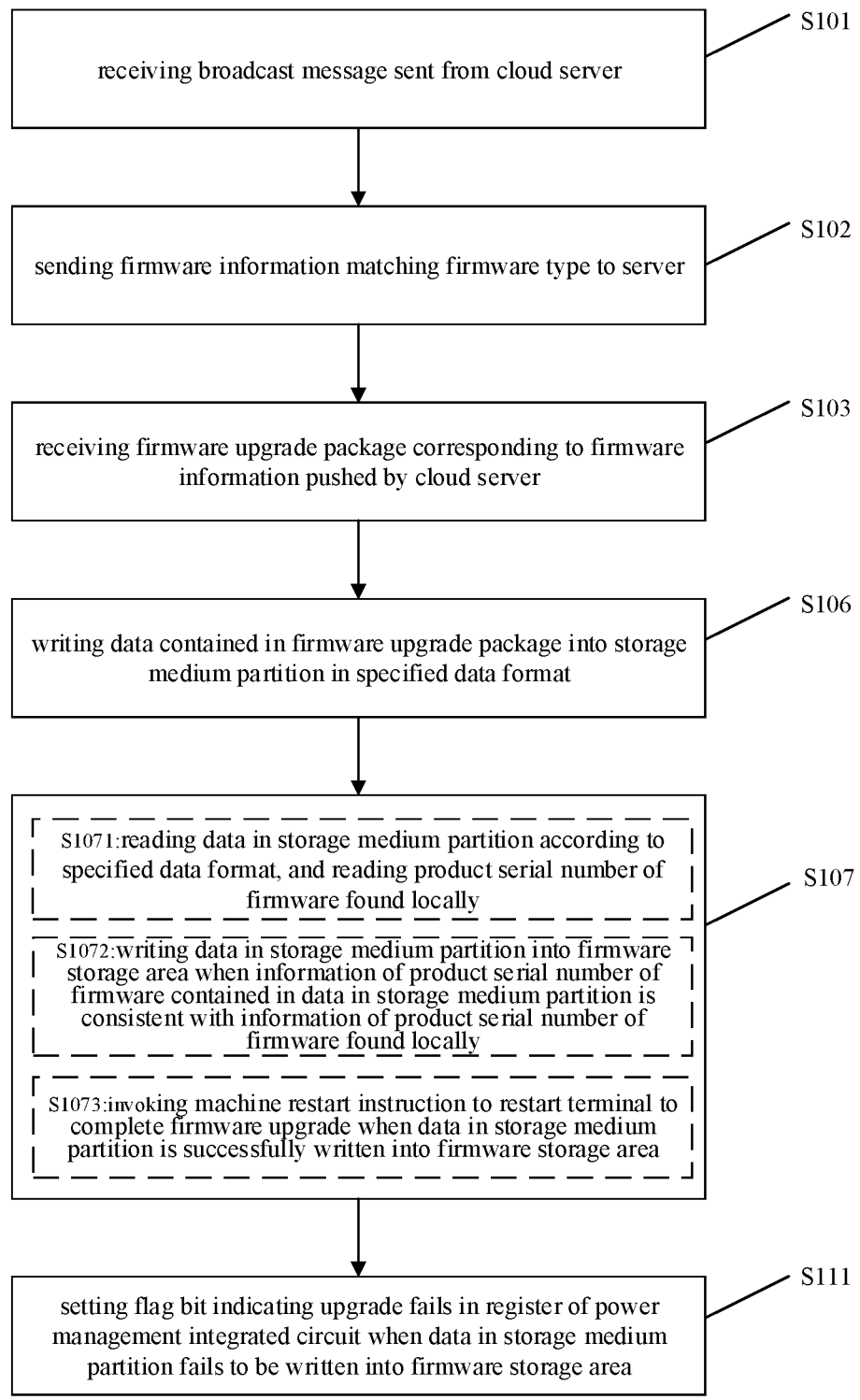
FIG. 7 is a flowchart illustrating yet another firmware upgrade method according to some embodiments of the present disclosure.

FIG. 7 is a flowchart illustrating yet another firmware upgrade method according to some embodiments of the present disclosure.

In some embodiments of the present disclosure, as shown in FIG. 7, the firmware upgrade method of the present disclosure further includes step S111 in addition to step S101, step S102, step S103, step S106, and step S107.

In step S111, a flag bit indicating that upgrade fails is set in a register of a power management integrated circuit, when the data in the storage medium partition fails to be written into a firmware storage area.

In order to prevent the cloud server from sending the wrong firmware upgrade package to the terminal, and to prevent the terminal from restarting repeatedly during the firmware upgrade process, the firmware whose last upgrade is failed can be marked and the flag bit can be read firstly before the terminal is restarted, if the flag bit that marks the last upgrade failure is found, the terminal can be powered on to be restarted normally.

That is, when the data in the storage medium partition fails to be written into the firmware storage area, it can be marked in any bit in QPNP_PON_XVDD_RB_SPARE in the register of the power management integrated circuit (PMIC). For example, the $7^{th}$ bit in QPNP__PON_XVDD_RB_SPARE can be marked as 1 to indicate that the last upgrade fails.

If the upgrade is successful this time, the $7^{th}$ bit in QPNP_PON_XVDD_RB_SPARE can be marked as 0, and machine restart can be invoked to restart the terminal.

Figure 8:
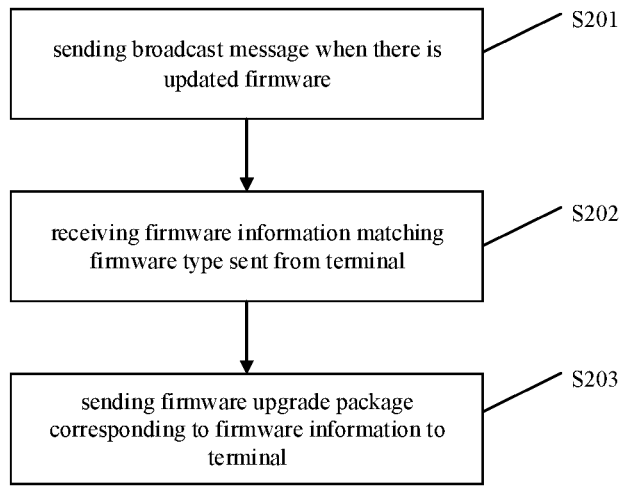
FIG. 8 is a flowchart illustrating yet another firmware upgrade method according to some embodiments of the present disclosure.

FIG. 8 is a flowchart illustrating yet another firmware upgrade method according to some embodiments of the present disclosure.

Based on the same inventive concept, as shown in FIG. 8, the firmware upgrade method applied to the cloud server includes: step S201, step S202, and step S203. Below, the step S201, step S202, and step S203 will be described, respectively.

In step S201, a broadcast message is sent when there is an updated firmware.

Herein, the broadcast message is used to broadcast an updated firmware type.

In step S202, firmware information matching a firmware type sent by a terminal is received.

In step S203, a firmware upgrade package corresponding to the firmware information is sent to the terminal.

The cloud server only sends the firmware upgrade package matching the firmware of the terminal, and the firmware upgrade package for the firmware that does not need to be upgraded in the terminal is stored in the cloud server. In this way, the space of the storage medium of the terminal can be effectively saved, and the efficiency of firmware upgrade can be improved.

In some embodiments of the present disclosure, the firmware upgrade method further includes: sending a download address of a firmware upgrade package corresponding to the firmware information to the terminal.

In some embodiments of the present disclosure, the receiving firmware information matching a firmware type sent by a terminal includes: receiving firmware information matching a firmware type sent by the terminal in JSON format.

Figure 9:
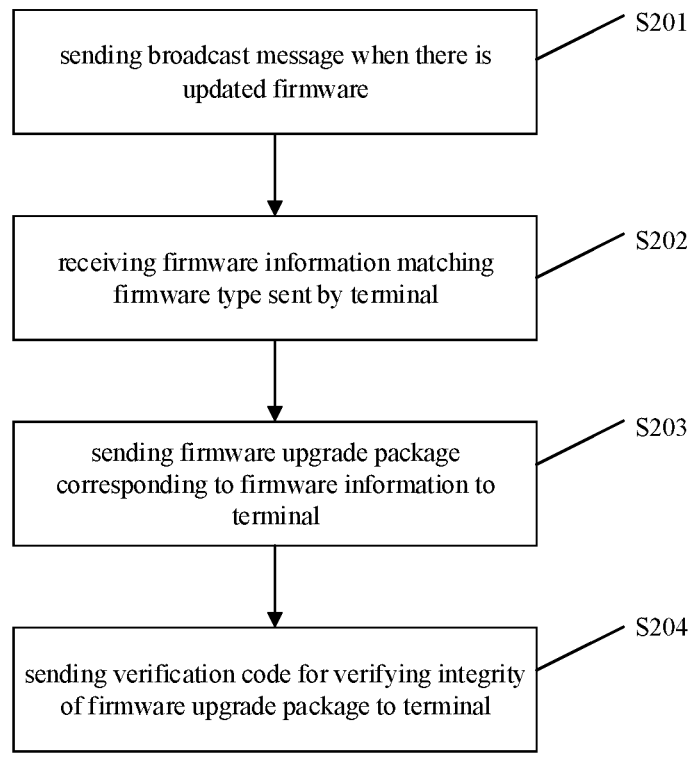
FIG. 9 is a flowchart illustrating yet another firmware upgrade method according to some embodiments of the present disclosure.

FIG. 9 is a flowchart illustrating yet another firmware upgrade method according to some embodiments of the present disclosure.

In some embodiments of the present disclosure, as shown in FIG. 9, the firmware upgrade method further includes step S204 in addition to step S201, step S202, and step S203.

In step S204, a verification code for verifying integrity of the firmware upgrade package is sent to the terminal.

In the embodiments of the present disclosure, the execution process of the method involved in the firmware upgrade method applied to the cloud server is similar to that of the firmware upgrade method applied to the terminal, thus, for the description of the firmware upgrade method applied to the cloud server which is not exhaustive, please refer to the above firmware upgrade method applied to the terminal, which will not be elaborated herein.

Figure 10:
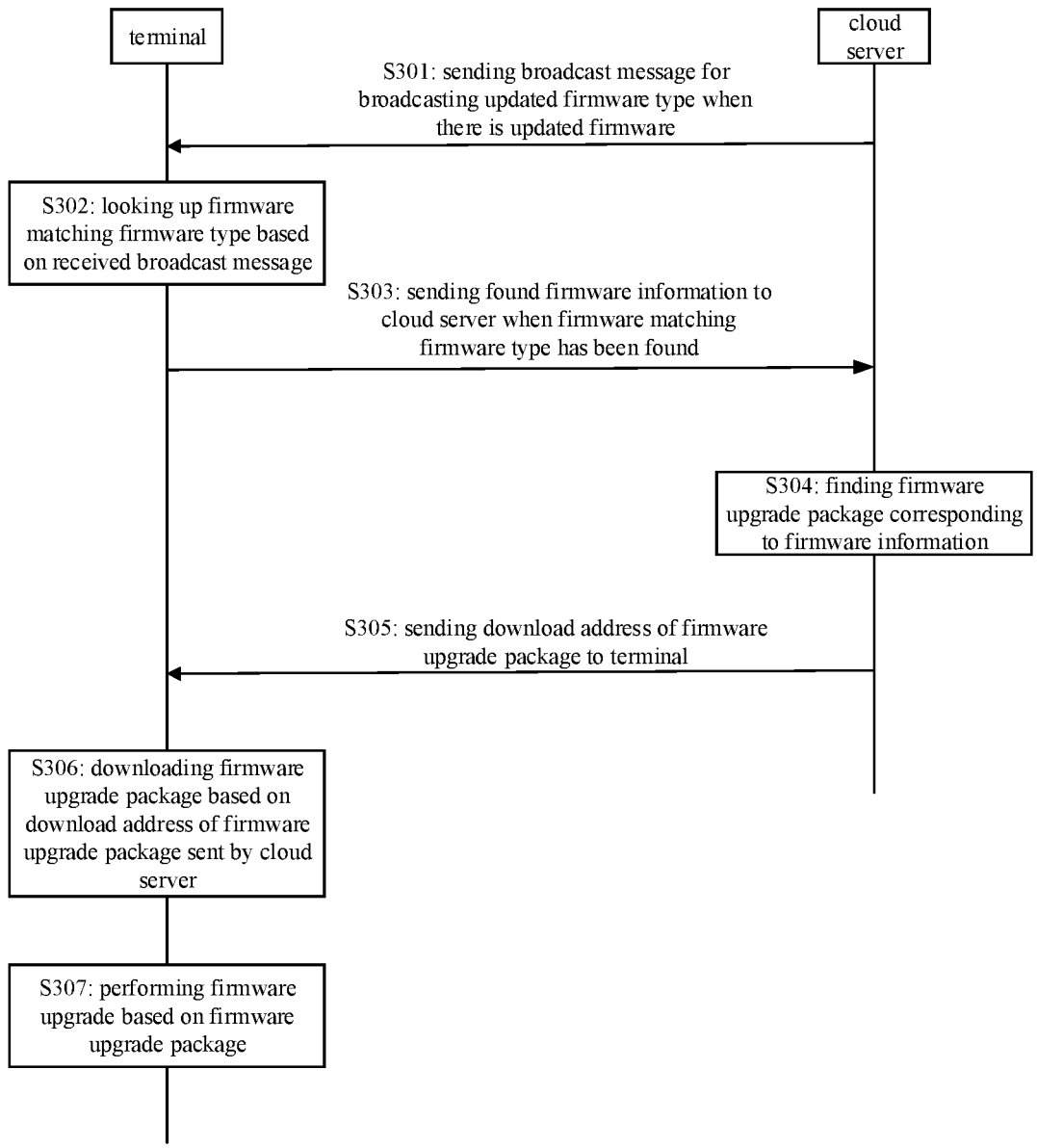
FIG. 10 is an interaction diagram illustrating a firmware upgrade method according to some embodiments of the present disclosure.

FIG. 10 is an interaction diagram illustrating a firmware upgrade method according to some embodiments of the present disclosure.

In some embodiments of the present disclosure, as shown in FIG. 10, the interaction process of the firmware upgrade method includes the following steps.

In step S301, a broadcast message for broadcasting an updated firmware type is sent when there is an updated firmware in the cloud server.

When there is an updated firmware, the cloud server sends a broadcast message about the firmware type of the updated firmware to respective terminals. The terminals receive the broadcast message sent by the cloud server.

In step S302, the firmware matching the firmware type is looked up by the terminal based on the received broadcast message.

After receiving the broadcast message sent by the cloud server, the terminals look up whether the firmware of the present terminal matches the updated firmware type broadcasted in the received broadcast message.

In step S303, the found firmware information is sent to the cloud server by the terminal when the firmware matching the firmware type has been found.

The terminal can invoke the local FFU_Tool in the terminal to find the product serial number of the firmware and the firmware version number of the local firmware in the terminal. And through the product serial number of the firmware and the firmware version number of the firmware, it is determined whether the type of the found firmware matches the type of the firmware broadcasted by the cloud server. If the type of the found firmware matches the type of the firmware broadcasted by the cloud server, the terminal can send the firmware information of the found firmware to the cloud server through the node at the bottom of CAT. The cloud server receives the firmware information sent by the terminal.

In step S304, the cloud server looks up the firmware upgrade package corresponding to the firmware information.

The cloud server receives the firmware information sent by the terminal and looks up the firmware upgrade package corresponding to the firmware information. Herein, the firmware information sent by the terminal corresponds to the firmware upgrade package in the cloud server.

After the cloud server has found the firmware upgrade package corresponding to the firmware information, the download address of the firmware upgrade package can be determined.

In step S305, the download address of the firmware upgrade package is sent to the terminal by the cloud server.

The cloud server determines the download address of the firmware upgrade package based on the found firmware upgrade package corresponding to the firmware information sent by the terminal. The cloud server sends the download address to the terminal, so that the terminal downloads the corresponding firmware upgrade package.

In step S306, the firmware upgrade package is downloaded by the terminal based on the download address of the firmware upgrade package sent by the cloud server.

The terminal will download the firmware upgrade package locally based on the download address of the firmware upgrade package sent by the cloud server.

In step S307, firmware upgrade is performed based on the firmware upgrade package by the terminal.

After downloading the firmware upgrade package locally, the terminal performs firmware upgrade on the corresponding firmware.

Figure 11:
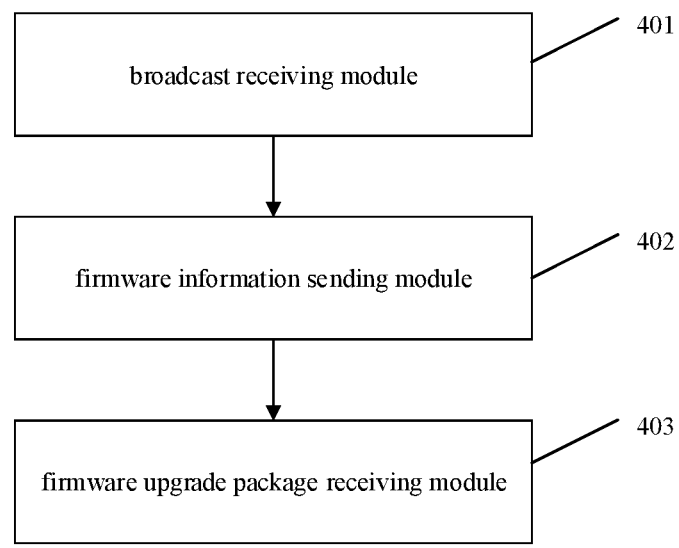
FIG. 11 is a schematic diagram illustrating a firmware upgrade device according to some embodiments of the present disclosure.

FIG. 11 is a schematic diagram illustrating a firmware upgrade device according to some embodiments of the present disclosure.

Based on the same inventive concept, as shown in FIG. 11, a firmware upgrade device applied to a terminal includes: a broadcast receiving module 401, a firmware information sending module 402, and a firmware upgrade package receiving module 403. Below, respective modules will be described, respectively.

The broadcast receiving module 401 is configured to receive a broadcast message for broadcasting an updated firmware type, sent by a cloud server.

The firmware information sending module 402 is configured to send firmware information matching the firmware type to the cloud server.

The firmware upgrade package receiving module 403 is configured to receive a firmware upgrade package corresponding to the firmware information, pushed by the cloud server.

In some embodiments of the present disclosure, the firmware upgrade device further includes an upgrade module configured to download the firmware upgrade package based on a download address of the firmware upgrade package, and perform firmware upgrade based on the firmware upgrade package.

In some embodiments of the present disclosure, the upgrade module is further configured to: write data contained in the firmware upgrade package into a storage medium partition in a specified data format; and read data in the storage medium partition and perform firmware upgrade after detecting that the terminal is powered on.

In some embodiments of the present disclosure, the firmware information sending module is configured to: invoke a firmware upgrade tool to view a product serial number and a firmware version number of a firmware stored locally in a terminal after the broadcast message is received by the terminal, and send a product serial number and a firmware version number of the firmware to the cloud server.

In some embodiments of the present disclosure, the firmware information sending module is configured to: send firmware information matching the firmware type to the cloud server in JSON format.

In some embodiments of the present disclosure, the firmware upgrade package receiving module is further configured to: receive a verification code for verifying integrity of the firmware upgrade package sent by the cloud server; and the upgrade module is further configured to: verify the integrity of the downloaded firmware upgrade package based on the verification code, and perform firmware upgrade based on the firmware upgrade package when the verification is passed.

In some embodiments of the present disclosure, the firmware upgrade device further includes: a download module configured to download the firmware upgrade package again based on the download address when the verification of integrity of the downloaded firmware upgrade package fails.

In some embodiments of the present disclosure, the specified data format includes: a flag bit of a firmware upgrade area in a storage medium partition, a product serial number of a firmware, a version number of a local firmware found in a terminal, a version number of a firmware written into a firmware upgrade area in a storage medium partition, a starting address of a firmware written into a firmware upgrade area in a storage medium partition, and a size of a firmware written into a firmware upgrade area in a storage medium partition.

In some embodiments of the present disclosure, the upgrade module is further configured to: read data in the storage medium partition in accordance with the specified data format, and read a product serial number of a firmware found locally; write data in the storage medium partition into a firmware storage area when information of a product serial number of a firmware contained in data in the storage medium partition is consistent with information of a product serial number of the firmware found locally; and invoke a machine restart instruction to restart a terminal as so to complete firmware upgrade, when the data in the storage medium partition is successfully written into the firmware storage area.

In some embodiments of the present disclosure, the upgrade module is further configured to: set a flag bit indicating that upgrade fails in a register of a power management integrated circuit, when the data in the storage medium partition fails to be written into a firmware storage area.

Figure 12:
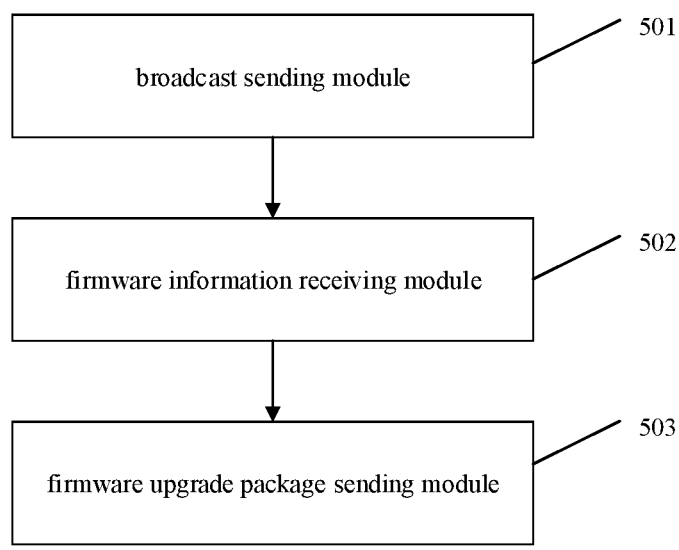
FIG. 12 is a schematic diagram illustrating another firmware upgrade device according to some embodiments of the present disclosure.

FIG. 12 is a schematic diagram illustrating another firmware upgrade device according to some embodiments of the present disclosure.

Based on the same inventive concept, as shown in FIG. 12, a firmware upgrade device applied to a cloud server includes: a broadcast sending module 501, a firmware information receiving module 502, and a firmware upgrade package sending module 503. Below, each module will be described, respectively.

The broadcast sending module 501 is configured to send a broadcast message for broadcasting an updated firmware type, when there is an updated firmware.

The firmware information receiving module 502 is configured to receive firmware information matching a firmware type, sent by a terminal.

The firmware upgrade package sending module 503 is configured to send a firmware upgrade package corresponding to the firmware information to the terminal.

In some embodiments of the present disclosure, the firmware upgrade package sending module 503 is further configured to: send a download address of a firmware upgrade package corresponding to the firmware information to the terminal.

In some embodiments of the present disclosure, the firmware information receiving module 502 is configured to: receive firmware information matching a firmware type, sent by a terminal, in JSON format.

In some embodiments of the present disclosure, the firmware upgrade package sending module 503 is further configured to: send a verification code for verifying integrity of the firmware upgrade package to the terminal.

With respect to the device in the above embodiments, the implementations for performing operations by individual modules therein have been described in detail in the embodiments regarding the methods, which will not be elaborated herein.

Figure 13:
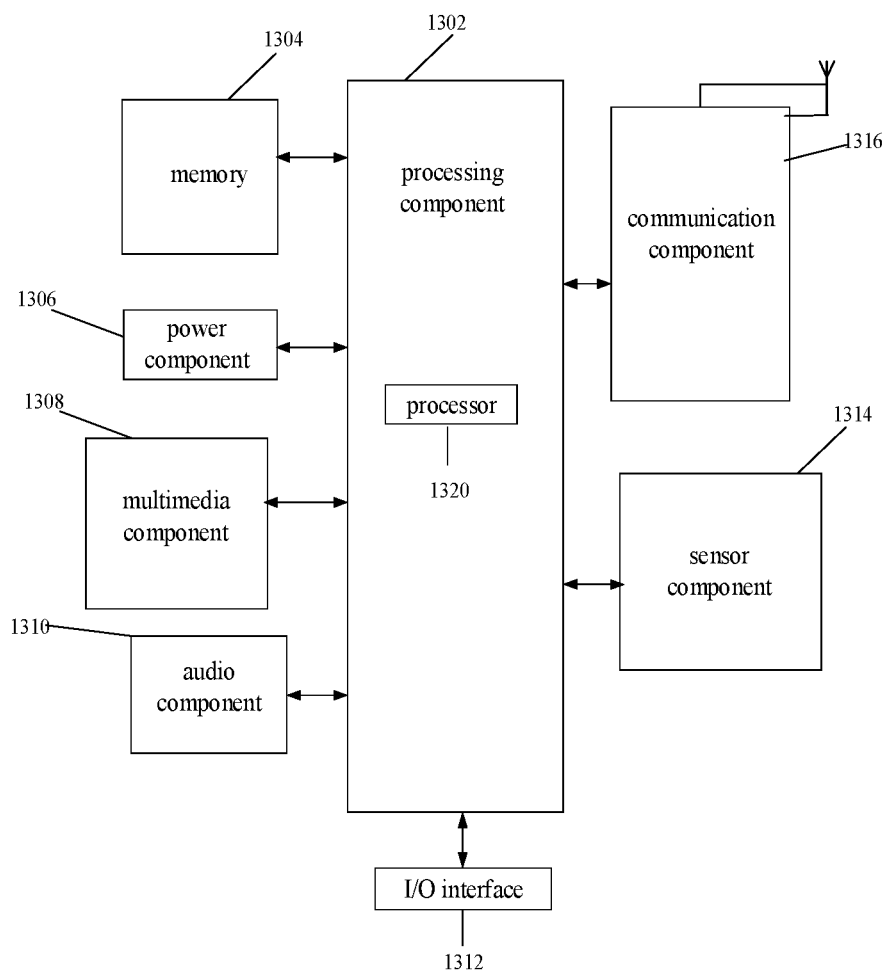
FIG. 13 is a block diagram of a device for firmware upgrade.

FIG. 13 is a block diagram of a device for firmware upgrade. Herein, FIG. 13 can represent a block diagram of a device used for the firmware upgrade method according to the first aspect of the present disclosure, and can also represent a block diagram of a device used for the firmware upgrade method according to the second aspect of the present disclosure.

The device for firmware upgrade can be a mobile phone, a computer, a digital broadcast terminal, a messaging device, a gaming console, a tablet, a medical device, fitness equipment, a personal digital assistant, and the like.

Referring to FIG. 13, the device for firmware upgrade can include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 typically controls overall operations of the device, such as the operations associated with display, telephone calls, data communications, camera operations, and recording operations. The processing component 1302 can include one or more processors 1320 to execute instructions to implement all or part of the steps in the above described methods. Moreover, the processing component 1302 can include one or more modules which facilitate the interaction between the processing component 1302 and other components. For instance, the processing component 1302 can include a multimedia module to facilitate the interaction between the multimedia component 1308 and the processing component 1302.

The memory 1304 is configured to store various types of data to support the operation of the device. Examples of such data include instructions for any applications or methods operated on the device for firmware upgrade, contact data, phonebook data, messages, pictures, videos, etc. The memory 1304 can be implemented by using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1306 supplies power to various components of the device. The power component 1306 can include a power management system, one or more power sources, and any other components associated with the generation, management, and distribution of power in the device.

The multimedia component 1308 includes a screen providing an output interface between the device for firmware upgrade and a user. In some embodiments, the screen can include a liquid crystal display (LCD) and a touch panel (TP). In some embodiments, organic light-emitting diode (OLED) or other types of displays can be employed.

If the screen includes the touch panel, the screen can be implemented as a touch screen to receive input signals from the user. The touch panel includes one or more touch sensors to sense touches, swipes, and gestures on the touch panel. The touch sensors can not only sense a boundary of a touch or swipe action, but also sense a period of time and a pressure associated with the touch or swipe action. In some embodiments, the multimedia component 1308 includes a front camera and/or a rear camera. The front camera and/or the rear camera can receive external multimedia data while the device is in an operation mode, such as a photographing mode or a video mode. Each of the front camera and the rear camera can be a fixed optical lens system or have focus and optical zoom capability.

The audio component 1310 is configured to output and/or input audio signals. For example, the audio component 1310 includes a microphone ("MIC") configured to receive an external audio signal when the device for firmware upgrade is in an operation mode, such as a call mode, a recording mode, and a voice recognition mode. The received audio signal can be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, buttons, and the like. The buttons can include, but are not limited to, a home button, a volume button, a starting button, and a locking button.

The sensor component 1314 includes one or more sensors to provide status assessments of various aspects of the device for firmware upgrade. For instance, the sensor component 1314 can detect an on/off status of the device, relative positioning of components, e.g., the display and a keypad, of the device for firmware upgrade, the sensor component 1314 can also detect a change in position of the device for firmware upgrade or one component of the device for firmware upgrade, a presence or absence of user contact with the device for firmware upgrade, an orientation or an acceleration/deceleration of the device for firmware upgrade, and a change in temperature of the device for firmware upgrade. The sensor component 1314 can include a proximity sensor configured to detect the presence of nearby objects without any physical contact. The sensor component 1314 can also include a light sensor, such as a CMOS or CCD image sensor, for use in imaging applications. In some embodiments, the sensor component 1314 can also include an accelerometer sensor, a gyroscope sensor, a magnetic sensor, a pressure sensor, or a temperature sensor.

The communication component 1316 is configured to facilitate wired or wireless communication between the device for firmware upgrade and other devices. The device for firmware upgrade can access a wireless network based on a communication standard, such as Wi-Fi, 2G, 3G, 4G, 5G, or a combination thereof. In one exemplary embodiment, the communication component 1316 receives a broadcast signal or broadcast associated information from an external broadcast management system via a broadcast channel. In one exemplary embodiment, the communication component 1316 further includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In some embodiments, the device for firmware upgrade can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In some embodiments, there is also provided a non-transitory computer-readable storage medium including instructions, such as the memory 1304 including the instructions executable by the processor 1320 in the device for firmware upgrade, for performing the above-described methods. For example, the non-transitory computer-readable storage medium can be a ROM, a random access memory (RAM), a CD-ROM, a magnetic tape, a floppy disc, an optical data storage device, and the like.

Various embodiments of the present disclosure can include one or more of the following advantages.

The firmware upgrade packages of the firmware that needs to be upgraded in the terminal are received, without receiving the firmware upgrade packages of the firmware that does not need to be upgraded in the terminal, thereby the space of the storage medium of the terminal is effectively saved, and the efficiency of firmware upgrade is improved.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components.

The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

It is intended that the specification and embodiments be considered as examples only. Other embodiments of the disclosure will be apparent to those skilled in the art in view of the specification and drawings of the present disclosure. That is, although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the example embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

It should be understood that "a plurality" or "multiple" as referred to herein means two or more. "And/or," describing the association relationship of the associated objects, indicates that there may be three relationships, for example, A and/or B may indicate that there are three cases where A exists separately, A and B exist at the same time, and B exists separately. The character "/" generally indicates that the contextual objects are in an "or" relationship.

In the present disclosure, it is to be understood that the terms "lower," "upper," "under" or "beneath" or "underneath," "above," "front," "back," "left," "right," "top," "bottom," "inner," "outer," "horizontal," "vertical," and other orientation or positional relationships are based on example orientations illustrated in the drawings, and are merely for the convenience of the description of some embodiments, rather than indicating or implying the device or component being constructed and operated in a particular orientation. Therefore, these terms are not to be construed as limiting the scope of the present disclosure.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

In the present disclosure, a first element being "on" a second element may indicate direct contact between the first and second elements, without contact, or indirect geometrical relationship through one or more intermediate media or layers, unless otherwise explicitly stated and defined. Similarly, a first element being "under," "underneath" or "beneath" a second element may indicate direct contact between the first and second elements, without contact, or indirect geometrical relationship through one or more intermediate media or layers, unless otherwise explicitly stated and defined.

Some other embodiments of the present disclosure can be available to those skilled in the art upon consideration of the specification and practice of the various embodiments disclosed herein. The present application is intended to cover any variations, uses, or adaptations of the present disclosure following general principles of the present disclosure and include the common general knowledge or conventional technical means in the art without departing from the present disclosure. The specification and examples can be shown as illustrative only, and the true scope and spirit of the disclosure are indicated by the following claims.

The invention claimed is:

1. A firmware upgrade method, applied to a terminal, the firmware upgrade method comprising:
  receiving a broadcast message for broadcasting an updated firmware type sent by a cloud server;
  sending firmware information matching the firmware type to the cloud server;
  receiving a firmware upgrade package corresponding to the firmware information pushed by the cloud server;
  writing data contained in the firmware upgrade package into a storage medium partition in a specified data format; and
  reading data in the storage medium partition and performing firmware upgrade after detecting that the terminal is powered on.

2. The firmware upgrade method according to claim 1, further comprising:
  downloading the firmware upgrade package based on a download address of the firmware upgrade package, and performing firmware upgrade based on the firmware upgrade package.

3. The firmware upgrade method according to claim 1, wherein the sending firmware information matching the firmware type to the cloud server comprises:
  invoking a firmware upgrade tool to view a product serial number and a firmware version number of a firmware stored locally in a terminal after the broadcast message is received by the terminal, and sending the product serial number and the firmware version number of the firmware to the cloud server.

4. The firmware upgrade method according to claim 2, further comprising:
  receiving a verification code for verifying integrity of the firmware upgrade package sent by the cloud server; and
  verifying integrity of the downloaded firmware upgrade package based on the verification code, and performing firmware upgrade based on the firmware upgrade package when the verification is passed.

5. The firmware upgrade method according to claim 4, further comprising:
  downloading the firmware upgrade package again based on the download address when the verification of the integrity of the downloaded firmware upgrade package fails.

6. The firmware upgrade method according to claim 1, wherein the reading data in the storage medium partition and performing firmware upgrade comprises:
  reading the data in the storage medium partition in accordance with the specified data format, and reading a product serial number of a firmware found locally;
  writing the data in the storage medium partition into a firmware storage area when information of a product serial number of a firmware contained in the data in the storage medium partition is consistent with information of a product serial number of the firmware found locally; and
  invoking a machine restart instruction to restart the terminal to complete firmware upgrade when the data in the storage medium partition is successfully written into the firmware storage area.

7. The firmware upgrade method according to claim 6, further comprising:
  setting, in a register of a power management integrated circuit, a flag bit indicating that the upgrade fails when writing the data in the storage medium partition into the firmware storage area fails.

8. A firmware upgrade method, applied to a cloud server, the firmware upgrade method comprising:
- sending a broadcast message for broadcasting an updated firmware type when there is an updated firmware;
- receiving firmware information matching a firmware type sent by a terminal;
- sending a firmware upgrade package corresponding to the firmware information to the terminal; and
- sending a verification code for verifying integrity of the firmware upgrade package to the terminal.

9. The firmware upgrade method according to claim 8, further comprising:
- sending a download address of the firmware upgrade package corresponding to the firmware information to the terminal.

10. A firmware upgrade device, applied to a terminal, the firmware upgrade device comprising:
- memory configured to store instructions; and
- a processor configured to:
  - receive a broadcast message for broadcasting an updated firmware type sent by a cloud server;
  - send firmware information matching the firmware type to the cloud server;
  - receive a firmware upgrade package corresponding to the firmware information pushed by the cloud server;
  - write data contained in the firmware upgrade package into a storage medium partition in a specified data format; and
  - read the data in the storage medium partition and perform firmware upgrade after detecting that the terminal is powered on.

11. The firmware upgrade device according to claim 10, the processor is further configured to:
- download the firmware upgrade package based on a download address of the firmware upgrade package, and perform firmware upgrade based on the firmware upgrade package.

12. The firmware upgrade device according to claim 10, wherein the processor is further configured to:
- invoke a firmware upgrade tool to view a product serial number and a firmware version number of a firmware stored locally in a terminal after the broadcast message is received by the terminal, and send the product serial number and the firmware version number of the firmware to the cloud server.

13. The firmware upgrade device according to claim 11, wherein the processor is further configured to:
- receive a verification code for verifying integrity of the firmware upgrade package sent by the cloud server; and
- verify integrity of the downloaded firmware upgrade package based on the verification code, and perform firmware upgrade based on the firmware upgrade package when the verification is passed.

14. A firmware upgrade device implementing the firmware upgrade method according to claim 9, applied to a cloud server, comprising a processing circuit configured to execute steps of the firmware upgrade method.

15. The firmware upgrade device according to claim 14, wherein the firmware upgrade method further comprises:
- sending a download address of the firmware upgrade package corresponding to the firmware information to the terminal.

16. A non-transitory computer-readable storage medium having stored therein computer-executable instructions executed by a processor to implement the firmware upgrade method according to claim 1.

17. A cloud system implementing the method of claim 1, comprising the terminal and the cloud server, wherein the cloud server is configured to:
- send the broadcast message for broadcasting the updated firmware type when there is the updated firmware;
- receive the firmware information matching the firmware type sent by the terminal; and
- send only the firmware upgrade package matching to the firmware information to the terminal;

wherein
- the terminal is configured not to receive firmware upgrade package of firmware that does not need to be upgraded in the terminal; and
- the firmware upgrade package for the firmware that does not need to be upgraded in the terminal is stored in the cloud server, thereby saving storage medium space of the terminal and improving efficiency of firmware upgrade.

* * * * *